(12) United States Patent
Pandey et al.

(10) Patent No.: US 8,527,605 B2
(45) Date of Patent: Sep. 3, 2013

(54) METHODS FOR PERFORMING CLIENT TO CLIENT COMMUNICATION IN A WLAN

(75) Inventors: Aparna Pandey, Chicago, IL (US);
Randy L. Ekl, Lake Zurich, IL (US);
Robert D. LoGalbo, Rolling Meadows, IL (US); Christopher G. Ware, Chicago, IL (US)

(73) Assignee: Motorola Solutions, Inc., Schaumburg (IL)

( * ) Notice: Subject to any disclaimer, the term of this patent is extended or adjusted under 35 U.S.C. 154(b) by 2739 days.

(21) Appl. No.: 11/088,584

(22) Filed: Mar. 24, 2005

(65) Prior Publication Data

US 2006/0218229 A1 Sep. 28, 2006

(51) Int. Cl.
*G06F 15/16* (2006.01)
*H04B 7/00* (2006.01)
*H04B 7/185* (2006.01)

(52) U.S. Cl.
USPC ............ 709/217; 709/203; 370/310; 370/317

(58) Field of Classification Search
USPC ......................................................... 709/217
See application file for complete search history.

(56) References Cited

U.S. PATENT DOCUMENTS

| 7,146,433 | B2 * | 12/2006 | Cromer et al. | 709/239 |
| 2002/0141375 | A1 * | 10/2002 | Choi | 370/347 |
| 2003/0174665 | A1 * | 9/2003 | Benveniste | 370/317 |
| 2004/0162093 | A1 | 8/2004 | Bevan et al. | |
| 2004/0264504 | A1 * | 12/2004 | Jin | 370/469 |
| 2006/0165021 | A1 * | 7/2006 | Tian et al. | 370/310 |
| 2006/0227801 | A1 * | 10/2006 | Nanda et al. | 370/447 |

FOREIGN PATENT DOCUMENTS

| WO | 03058984 A2 | 7/2003 |
| WO | 2004032536 A2 | 4/2004 |
| WO | 2004059913 A2 | 7/2004 |

OTHER PUBLICATIONS

International Search Report and Written Opinion for counterpart International Patent Application No. PCT/US06/08328 mailed Jun. 19, 2008.
International Preliminary Report on Patentability and Written Opinion for counterpart International Patent Application No. PCT/US06/08328 mailed Mar. 12, 2009.
Office Action mailed Jan. 5, 2010 in counterpart Canadian Patent Application No. 2600993.
Supplementary European Search report mailed Mar. 5, 2012 in counterpart European Patent Application No. 06737495.9.
Kwak, H. et al., "Efficient two-hop wireless channel across protocol," IEEE VTC, vol. 4, pp. 2266-2270, Apr. 22, 2003.
Lee, S. et al., "The case for a multi-hop wireless local area network," In Proceedings of INFOCOM, vol. 2, pp. 894-905, 2004.

* cited by examiner

*Primary Examiner* — John Follansbee
*Assistant Examiner* — Alan S Chou
(74) *Attorney, Agent, or Firm* — Indira Saladi; Anthony P. Curtis; Daniel R. Bestor (57) ABSTRACT

Methods for performing client to client communication in a wireless local area network are disclosed. At an 'n' tier client in the wireless local area network, a signaling message from an 'n−1' tier client is received wherein the signaling message comprises a first period, a second period, and a third period. Communicating with the 'n−1' tier client during the first period and communicating with the 'n+1' tier client during the third period. At an access point in the wireless local area network, an association table identifying clients in the wireless local area network is created and a first period for client to client communication based upon the association table and traffic in the wireless local area network is determined where the access point does not communicate with the clients during the first period.

18 Claims, 6 Drawing Sheets

METHODS FOR PERFORMING CLIENT TO CLIENT COMMUNICATION IN A WLAN

FIELD OF THE INVENTION

The present invention relates generally to wireless communication systems and in particular to the field of client to client communication in wireless local area networks.

BACKGROUND OF THE INVENTION

In a wireless local area network (WLAN), there are clients and access points (APs) where typically the clients are endpoints of a communication path, and the APs are typically stationary and the intermediaries by which a communication path to a client may be established or maintained. In general, when a first client wishes to communicate with a second client served by the same AP, the messages of the communication need to traverse two hops. That is, messages from the first client are sent from the first client to the AP and then from the AP to the second client. Having the communication traverse two hops is inefficient and it is generally desirable in a WLAN to have clients communicate directly with each other without having to utilize an AP.

In some WLANs, allowing a first client to communicate with a second client is accommodated by providing for a Direct Link Mode. Direct Link Mode allows a first client and a second client to directly communicate without traversing through the AP. Direct Link Mode, however, requires a setup of the clients where the setup necessitates the need for an AP. The first client and the second client must send messages to the AP notifying the AP of their existence. Thus, the first client and the second client must be within hearing range of the AP to notify the AP of their existence. If either the first client or the second client is not within hearing range of the AP, they will not be able to directly communicate. This is a problem if the first client and the second client are within hearing range of each other but one or both of them is not within hearing range of the AP. Thus, by requiring the AP, the range of coverage served by the AP is limited.

The prior art method of client to client direct communication is inadequate if a client is not within hearing range of the AP. Accordingly, there exists a need for an improved method of client to client communication in a wireless local area network.

BRIEF DESCRIPTION OF THE FIGURES

A preferred embodiment of the invention is now described, by way of example only, with reference to the accompanying figures in which.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Figure 1:
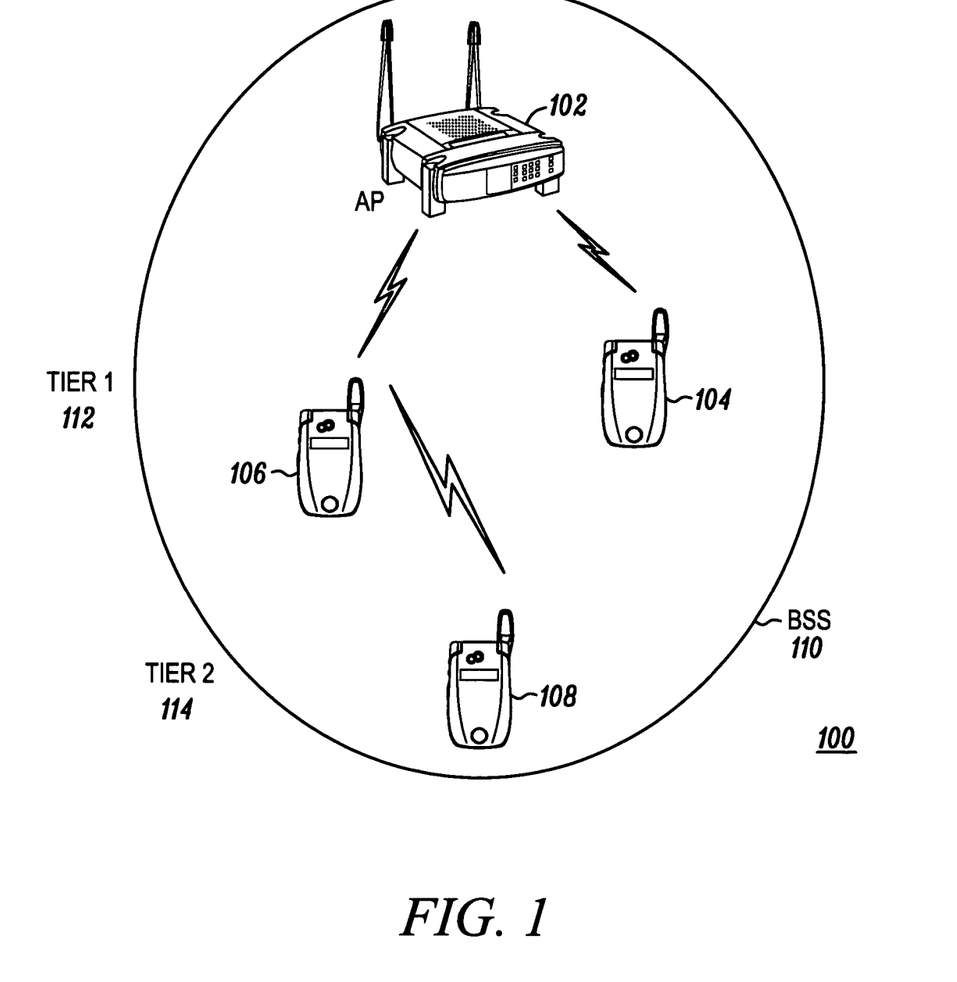
FIG. 1 is an example block diagram illustrating a typical wireless local area network system in accordance with an embodiment of the invention.

An embodiment of the present invention is described with reference to FIG. 1. Shown in FIG. 1 is a wireless local area network (WLAN) 100 having a single access point (AP) 102 and multiple tiers 112, 114 of clients 104, 106, 108. The AP 102 provides access to a wired network (not shown) either directly or indirectly, e.g. via a tiered network of many more APs. As used herein, a basic service set (BSS) 110 is a single AP 102 and all the clients associated with the AP 104, 106, 108. All communications in the WLAN are sent on a single frequency, namely one channel. The AP and all the clients in the BSS utilize the one channel to communicate with each other. Thus, each of the clients 104, 106, 108 and the AP 102 communicate with each other on the one channel.

The clients 104, 106, 108 of the BSS 110 are considered to be tiered. That is, a tier 1 client communicates directly with the AP for access to the wired network (not shown) or for access to the rest of the WLAN communications hierarchy. In a second tier, a tier 2 client communicates indirectly with the AP for access to the wired network (not shown) or for access to the rest of the wireless WLAN communications hierarchy where indirectly means that the tier 2 client communicates with a tier 1 client directly and the tier 1 client forwards the tier 2 client communications to the AP. For example, the tier 2 client, e.g. client 108, may not be in hearing range of the AP, e.g. AP 102, and may not be able to see that the AP, e.g. AP 102, is available to it. However, the tier 2 client, e.g. client 108, is within hearing range of the tier 1 client, e.g. client 106, and allowing the tier 1 client, e.g. client 106, to serve as a relay of communication expands the range of the BSS 110.

As used herein, the tier that a client is a part of specifies the number of hops that the client is away from the AP. For example, a tier 2 client is two hops away from the AP. By allowing for more than one hop to the AP, the range of the BSS 110 is extended. Although only two tiers of clients are shown in FIG. 1, many more tiers of clients may exist. For example, an embodiment of the present invention is contemplated to work where there are three or more tiers of clients. In any case, the tier 1 clients of the WLAN communicate with the APs of the WLAN.

As will be appreciated by those of skill in the art, the clients may be any suitable type of wireless communications device capable of communicating within an ad-hoc network, such as computers, personal data assistants (PDAs), fixed mounted devices, vehicular mounted devices, or handheld devices, as well as others. Certain of the clients may also be connected to a fixed communications infrastructure, if desired.

Figure 2:
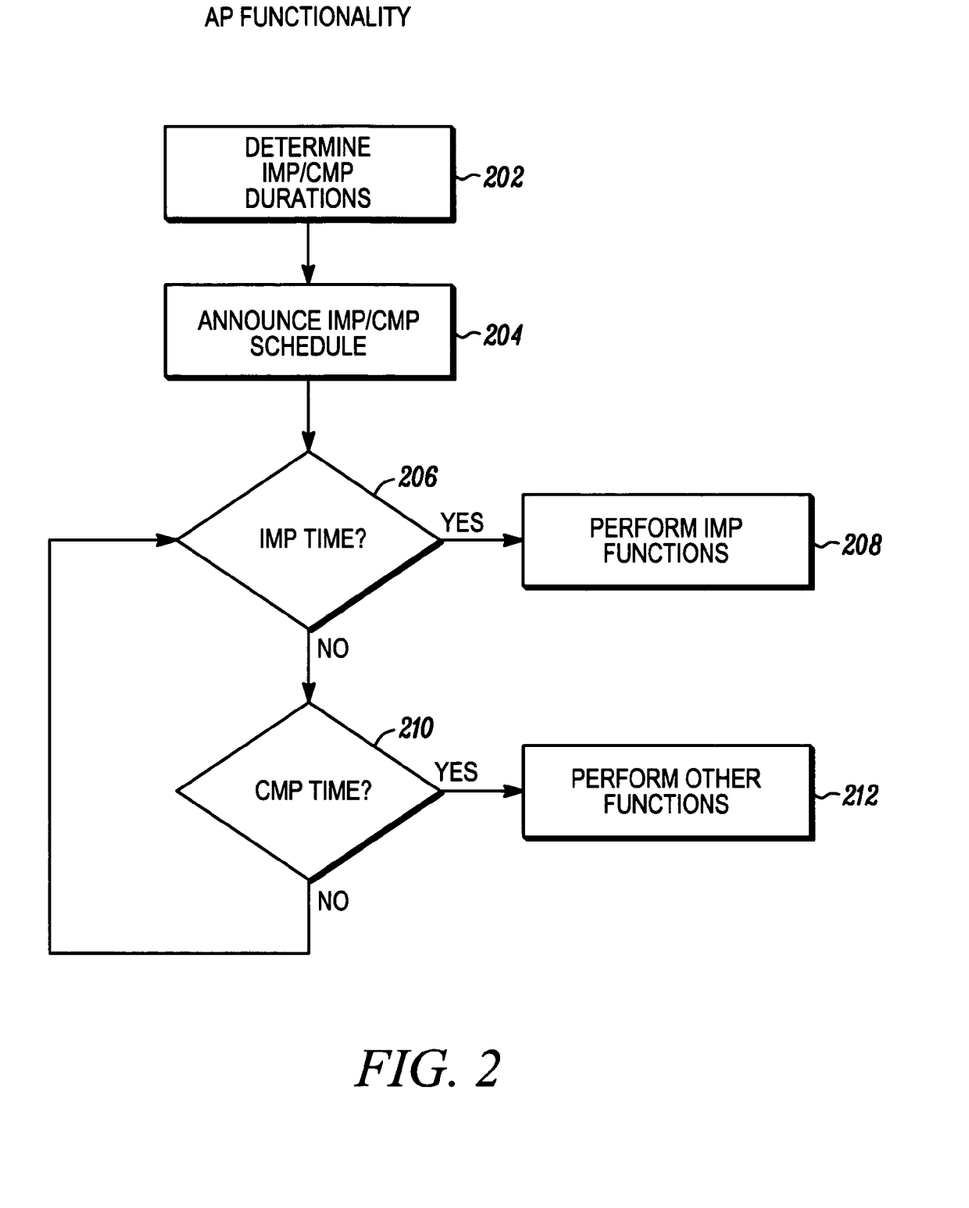
FIG. 2 is a flow diagram illustrating a method for client to client communication from an access point's perspective in accordance with an embodiment of the invention.
Figure 3:
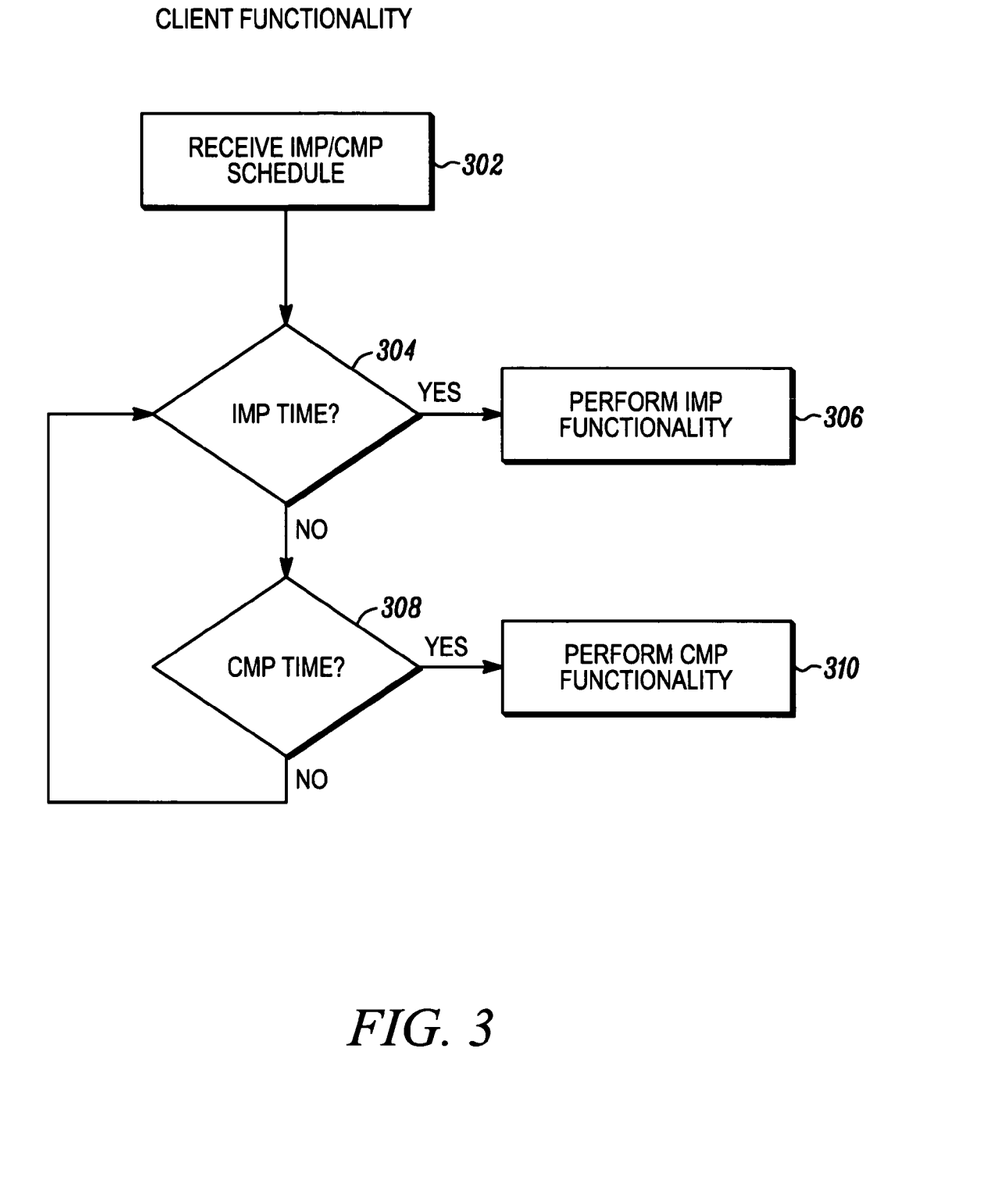
FIG. 3 is a flow diagram illustrating a method for client to client communication from a client's perspective in accordance with an embodiment of the invention.

A method for performing client to client communication in the WLAN 100 according to an embodiment of the present invention will now be described with reference to the flow diagrams of FIGS. 2 and 3. By way of example, FIG. 2 illustrates the method an AP performs in facilitating client to client communication and FIG. 3 illustrates the corresponding method a client performs in facilitating client to client communication. In general, the AP determines a first time period during which the AP is available to communicate with the tier 1 clients and correspondingly determines a second time period during which clients can communicate with other clients. As used herein, the first time period is termed an Infrastructure Mode Period (IMP) and the second time period is termed a Client Meshing Period (CMP).

The AP determines the duration and scheduling of IMPs and CMPs (Block 202) based upon a number of factors including factors related to traffic and clients. In an exemplary embodiment, the AP analyzes an association table which has information relating to all the clients that are in the BSS regardless of whether the AP can hear the client or not. As is known to one of ordinary skill in the art, the association table may be populated with information from a routing table where a routing table has information relating to how to reach each client, how many hops away each client is from the AP, and/or the number of clients associated with the AP. In addition, the AP analyzes the traffic to determine the source and/or destination and the tier that the source and/or destination is associated with. As used herein, traffic is defined as the communications destined to clients and the communications received from clients of the WLAN. For example, if much traffic is being sent from a tier 2 client, then the AP may calculate the duration of the CMP to ensure that the tier 2 client is able to communicate.

In an exemplary embodiment, the scheduling of the IMPs and CMPs is determined such that the IMPs and the CMPs do not overlap. That is, the IMP is a first time period and the CMP is a second time period where the first time period and the second time period do not overlap. This is an important limitation since the IMP is for traffic delivery between tier 1 clients and the AP and during this time period the AP must be awake and providing coverage. Such a limitation is important because in a system where the IMPs and the CMPs overlap, the resulting system may operate with reduced overall efficiency. For example, where the IMPs and CMPs overlap, the resulting system may have less throughput and the clients of the resulting system may need to stay awake longer than necessary which may waste battery power of the clients.

In an exemplary embodiment, traffic delivery performed during the IMP is unicast traffic where each communication is addressed to one destination. In another embodiment, the IMP can also be used for multicast and broadcast traffic.

Returning to FIG. 2, information relating to the IMP is announced in a signaling message. In one embodiment, the information comprises a start time, end time, and/or duration of the IMP. In another embodiment, only the IMP start time is announced in a signaling message. In another embodiment, both the IMP start time and the IMP duration are announced in the signaling message. In an alternative embodiment, both the IMP start time and an IMP end time are announced in a signaling message. In any case, in an exemplary embodiment, the IMP start time is a fixed time. However, the end time may be pushed out if extra time is necessary. There must be at least one IMP per beacon interval but there may be more than one IMP per beacon interval.

In contrast, the CMP is for all types of client communication between clients in the BSS regardless of whether the client communication is unicast, broadcast, or multicast. During the CMP, the AP has to make sure that it does not cause interference to the clients communicating and performs tasks that do not interfere with CMP communications. For example, the AP may stay quiet, perform backhaul activities, or perform other tasks that do not interfere with communicating with the tier 1 clients. In an exemplary embodiment, the CMP may coincide with the AP performing backhaul where the AP performs backhaul on a different channel than it provides coverage, since the AP does not need to provide coverage during the CMP. The information relating to the CMP is announced in a signaling message. In one embodiment, the information comprises a start time, end time, and/or duration of the CMP. In one embodiment, only the CMP start time is announced in a signaling message. In another embodiment, both the CMP start time and a CMP duration are announced in a signaling message. In an alternative embodiment, both the CMP start time and a CMP end time are announced in a signaling message. In any case, in an exemplary embodiment, the CMP start time may be delayed if the IMP runs over. The CMP end time is a fixed time. There may be one or more CMPs per beacon interval.

In one embodiment, there may be proprietary signaling, e.g. a new message, that takes place to assist the AP in determining the IMP and CMP durations and how often they should occur. For example, a tier 1 client may send a message to the AP to increase the CMP duration and may specify the amount of time that the tier 1 client needs to better service its tier 2 clients. Likewise, the tier 1 client may send a message to the AP to increase how often the tier 1 client needs the IMP to satisfy the delay constraints of its traffic frames. Having proprietary signaling is useful if the traffic generated from a tier 2 client never needs to go to the AP and it is only meant for a tier 1 client or for another tier 2 client in the BSS. In such a case, having the tier 1 client tell the AP that it needs more CMP is useful to efficiently service the tier 2 client.

Returning to FIG. 2, the AP announces timing information relating to the IMP and CMP (Block 204) by sending signaling messages. As used herein, the timing information is termed an IMP/CMP schedule. The IMP/CMP schedule captures the duration and the scheduling of IMPs and CMPs that the AP determined based upon the number of factors (Block 202). The signaling messages used can be beacon transmissions (also termed "beacons"), routing messages, or other similar protocol related messages. An embodiment of the present invention is described with reference to beacons. In general, beacons are defined as packets transmitted by an AP and/or clients in the WLAN that has information about the WLAN such as timing synchronization, traffic queues, and the capabilities of the sender, e.g. the AP.

In such an embodiment and as known in the IEEE 802.11 art, beacons transmitted by an AP are transmitted periodically and a beacon interval is defined as the time between consecutive beacons transmitted by an AP. The time that the AP sends its beacon is a part of the IEEE 802.11 standard and is well known. Further, in an embodiment of the present invention, the clients also transmit beacons. The beacons transmitted by clients are transmitted during a specially designated time period called a Beacon Propagation Period. In an illustrative embodiment of the present invention, whether the beacons are from an AP or a client, the beacons comprise an information field which tells clients in the BSS when the Beacon Propagation Period is. Knowing the Beacon Propagation Period gives clients an indication of when beacons are likely to be transmitted by the other clients in the BSS. In an illustrative embodiment, the Beacon Propagation Period immediately follows the time that a beacon is received from the AP. Other embodiments may be implemented where the Beacon Propagation Period follows the time that a beacon is received from the AP after a delay. In any case, the Beacon Propagation Period is a protected time period where protected means that traffic other than beacons shall not be transmitted during the Beacon Propagation Period. In an alternative embodiment, other protected periods may be available for transmission of other signaling messages.

Referring to FIG. 3, clients receive the IMP/CMP schedule (Block 302). In an exemplary embodiment, clients receive the IMP/CMP schedule in a beacon and are awake when the beacon is transmitted so that the IMP/CMP schedule is propagated to all the clients in the BSS. During an expected beacon transmission, the client locks onto a channel number corresponding to the AP and listens for beacons. In one embodiment, the beacon that the AP uses to transmit the IMP/CMP schedule to the clients comprises the IMP start time, the CMP start time, the Beacon Propagation Period, and other 802.11-based standard information, e.g. pending traffic for the tier 1 clients, a Timing Synchronization Function (TSF) timer, etc. In another embodiment, the beacon that the AP uses to transmit the IMP/CMP schedule further comprises the IMP duration and/or the CMP duration, in addition, to the above listed information.

In an alternative embodiment, the beacon that the AP transmits to the clients also includes information relating to a Random Access Period where the Random Access Period is a time when new clients in the BSS can associate with the AP. A new client is a client that the AP does not have direct or indirect knowledge of. For a new client to be known to the AP, the new client needs to send an association message to the AP. This may be done directly, if the new client is in hearing range of the AP, or indirectly, by sending a message to a tier 1 client (if the new client is a tier 2 client), which in turn relays the message to the AP. In such an alternative embodiment, association may be performed during the IMP time instead of an explicitly announced Random Access Period.

In an exemplary embodiment, clients also transmit beacons to announce the IMP/CMP schedule to higher tier clients in the BSS. For example a tier 1 client may transmit beacons in order to support tier 2 clients and a tier 2 client may transmit beacons in order to support tier 3 clients. Thus, the level and number of tiers of clients is unlimited even though only two tiers of clients are illustrated in FIG. 1.

In one embodiment, the ability of a tier 1 client to transmit a beacon can be controlled system-wide by controlling the Beacon Propagation Period field in the AP's beacon. For example, to disable multi-tier client architecture, the value of Beacon Propagation Period can either be set to 0 or this field need not be included at all. The ability of a tier 1 client to transmit a beacon is also dependent on other parameters like remaining battery life, whether the tier 1 client supports tier 2 clients or not, security policy etc. For example, if the tier 1 client does not support tier 2 clients then there is no need to retransmit the beacons from the tier 1 client. In an exemplary embodiment, in order to reduce the overhead required for beacon transmissions by clients, the beacons may be transmitted at a higher data rate and/or less frequently than beacons from APs.

In an exemplary embodiment, transmitting beacons by the tier 1 clients requires the tier 1 clients to efficiently access the channel. Tier 1 clients may access the channel by using contention based access procedures, such as described by IEEE 802.11, where tier 1 clients randomly back off and contend for the channel. Using a contention based access procedure is simple to implement. Further, using a contention based access procedure allows for spatial reuse of wireless channels where two clients that are not within hearing range may transmit beacons at the same time without causing a collision. Alternatively, the tier 1 clients may use polling-based channel access to access the channel. In this case, the AP polls the given clients for beacon transmissions.

Regardless of the method that the tier 1 clients use to access the channel, the information that the tier 1 client's beacon comprises includes information relating to the IMP/CMP schedule. Such information includes the CMP start time, the IMP start time, the CMP duration, the IMP duration, the CMP end time, the IMP start time, the Beacon Propagation Period, the number of hops to the AP, whether there is pending traffic for the tier 2 clients, and the TSF timer. Having information relating to the number of hops to the AP is important if the tier 2 clients wants to choose a tier 1 client that is closest to the AP. The beacon that the tier 1 clients use to transmit the IMP/CMP schedule may also include other relevant information carried by the AP's beacons. Optionally, the beacon may also include information relating to the Random Access Period. In an exemplary embodiment, the beacon that the tier 1 clients use to transmit the IMP/CMP schedule may be shorter than the AP's beacons.

In embodiments of the present invention, the frequency with which beacons are transmitted by clients in the WLAN may be variable based on a number of factors including the number of hops to the AP and if one or more higher tier neighboring clients are supported. In one embodiment, the clients may transmit beacons less frequently than the APs may transmit beacons and the lower tier clients may transmit beacons more frequently than higher tier clients. For example, a lower tier client, such as client 106, which supports higher tier clients, such as client 108, may transmit beacons more frequently than other clients in the WLAN 100. Since the clients at a higher tier are further away from the AP, than a client at a lower tier and the client at the lower tier is supporting the higher tier client, all the traffic between the AP and the higher tier client is transmitted via the lower tier client. In any case, the frequency of beacons from the tier 1 clients may be less frequent than beacons from the AP. Further, beacons from tier 1 clients may not be periodic since the random back off preceding the contention-based access may shuffle the order of beacon transmissions, so that the tier 1 clients do not transmit beacons at the same rate and/or same periodicity.

Returning to FIG. 2, the AP delivers traffic according to the communicated IMP/CMP schedule. If it is IMP start time (Block 206), then the AP initiates IMP functions (Block 208). IMP functions include processing communications of the tier 1 clients and transmitting and receiving messages to/from the tier 1 clients. If it is CMP start time (Block 210), then the AP commences other functionality that does not interfere with the clients in the BSS (Block 212). During the CMP, the AP is performing other tasks, e.g. processing backhaul functions as a parent or child in a multi-tier backhaul, or the AP may stay silent. As used herein, backhaul is defined as the transfer of data and signaling from one AP to another AP in the WLAN. Referring to FIG. 3, the clients process communications according to the communicated IMP/CMP schedule. If it is IMP start time (Block 304), the clients initiate IMP functionality (Block 306). For example, if the client is a tier 1 client, then the client interacts with the AP. If the client is a tier 2 client, then the client performs other functionality which does not interfere with the communication between tier 1 clients and the AP, such as, power save, passive scanning for neighboring devices or active scanning on another channel. In other words, during IMP, the tier 1 client communicates with the AP and other clients do not communicate with the tier 1 clients. If it is CMP start time (Block 308), then the client initiates CMP functionality (Block 310). During the CMP, the tier 1 client communicates with other clients, namely tier 2 clients and/or other tier 1 clients. During the CMP, the tier 1 client does not communicate with the AP.

During the IMP, the tier 1 clients and the AP can use any known channel access scheme to access the channel and communicate with each other. Similarly, during the CMP, the clients can use any channel access scheme to access the channel and communicate with each other. In other words, channel access can be performed by utilizing any of the following access mechanisms such as contention-based, polling-based, schedule-based or a hybrid scheme access. In an exemplary embodiment, the tier 1 client polls its tier 2 clients to perform traffic exchange. The tier 1 client randomly selects a tier 2 client to poll and randomly selects a start time to poll where the start time is during the CMP. In an exemplary embodiment, the tier 1 client captures the channel for polling using contention-based access, where capturing the channel means winning the right to transmit on the channel and/or winning control of the channel. In an embodiment of the present invention, polling clients may be performed in any order. For example, the tier 1 client may poll client 4 first, and then client 1. During this process, the tier 2 clients must be awake and await their turn to be polled.

In an exemplary embodiment, the tier 1 client selects a random start time during the CMP to wake up, capture the channel and service the tier 2 clients. In one embodiment, the tier 2 clients are awake and listening for tier 1 clients from the beginning of the CMP as opposed to the random start time during the CMP and the random start time chosen by the tier 1 client may be different for each CMN. In an alternative embodiment, the tier 1 client announces the random start time via a signaling message like the beacon and adheres to this start time for all CMPs till the next beacon. This enables the tier 2 clients to sleep or perform other functions until the random start time of the CMP occurs.

The random start time may be chosen such that the tier 1 client has enough time to poll all the tier 2 clients and process all the awaiting data/control messages for the tier 2 clients. In the case where there are no data/control messages to process, the tier 1 client may sleep and save its power. In an exemplary embodiment, if there are data/control messages to process, the tier 1 client wakes up at the random start time during a CMP, senses the channel, and captures the channel, via contention-based access for example, to send a polling message for data to a randomly selected tier 2 client from amongst its known list of tier 2 clients that it is supporting. In an exemplary embodiment, the order in which the tier 1 client polls the tier 2 clients is randomized to support fairness in access, to support power saving of the tier 2 clients and to minimize interference. During this period, the tier 1 client may also send broadcast and/or multicast traffic to the tier 2 client. At the end of the traffic exchange, the tier 2 client goes to sleep and the tier 1 client polls the next tier 2 client in its polling list. If there are no more tier 2 clients to poll, then the tier 1 client goes to sleep also.

Whether the tier 1 client announces specific poll times or not, power management of the clients is encouraged. Thus, clients need only be awake when traffic is processed and are not required to remain awake for entire CMPs when there is no traffic to process.

To accommodate the transmission of multicast and/or broadcast traffic by the AP, in an exemplary embodiment, the AP may set aside a time following the Beacon Propagation Period for transmitting the multicast and/or broadcast traffic. This may occur during a special IMP that is placed immediately after the Beacon Propagation Period. In an alternative embodiment, the IMP for transmitting the multicast and/or broadcast traffic may be placed immediately after the transmission of the AP's beacon and before the Beacon Propagation Period. During the CMP, the tier 1 clients may transmit the multicast and/or broadcast traffic after capturing the channel and prior to commencing polling higher tier clients, where, as mentioned above, capturing the channel means winning the right to transmit on the channel and/or winning control of the channel.

All clients need to associate with the AP in order to join a BSS. Traditionally, any new client that enters the BSS will use contention based methods to capture the channel to send an association request message to the AP. The AP may respond by sending an association response, which either accepts or rejects the association request of the client. It is advisable that all new clients that need to associate with an AP adhere to the CMP/IMP schedule and their rules, which they can learn from the AP's beacon or the tier 1 client's beacon. Alternatively, the AP can set aside a Random Access Period (announced via a signaling message) for new clients to send association requests.

The tier 1 clients can also set aside a part of a CMP as Random Access Periods which are announced by the tier 1 clients via signaling messages such as beacons. The Random Access Periods within a CMP can be used by the tier 2 clients to send an association request or a request to be put on a particular client's polling list. During this period, one tier 1 client may be awake, listening for tier 2 clients and only those tier 2 clients that need to associate or get on a polling list need to be awake. The tier 2 clients may send association messages or requests to be put on their polling list to the tier 1 clients.

Figure 4:
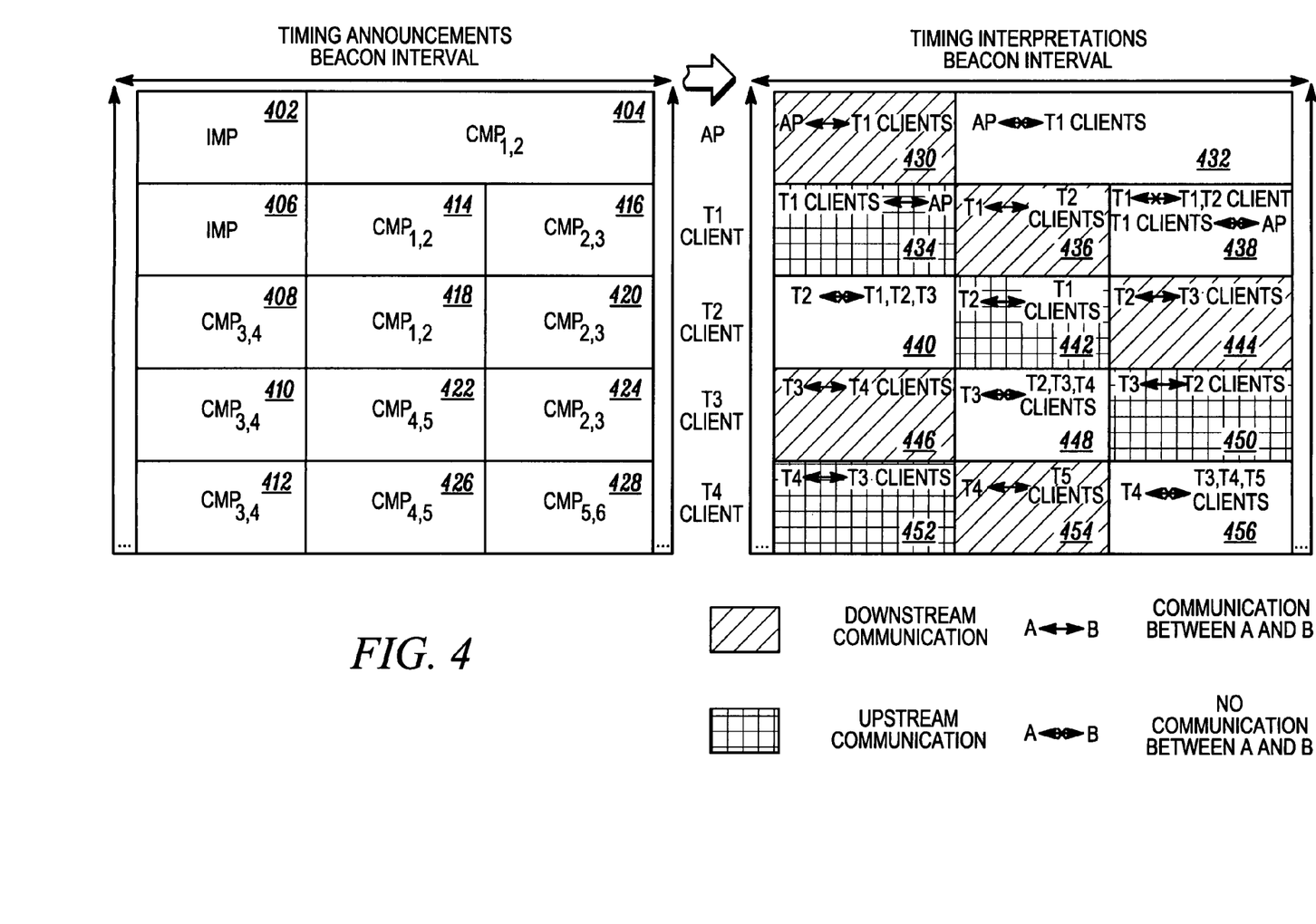
FIG. 4 is an example timing diagram illustrating IMPs and CMPs for an n-tier wireless local area network.

The above explanation has been described with respect to a WLAN with two tiers of clients. FIG. 4 illustrates a timing diagram for an embodiment of the invention with three or more tiers of clients. In one embodiment, the IMP/CMP schedule as shown in FIG. 4 is first announced by the AP to the tier 1 clients. Then, each client at tier "n" announces three CMPs, namely $CMP_{n,n-1}$, $CMP_{n,n+1}$ and $CMP_{n+1,n+2}$ where n is an integer. The subscripts refer to the tier of clients that can communicate during the CMP. For example, during $CMP_{n,n+1}$, tier n and tier n+1 clients can communicate with each other. For example, for n=2, a tier 2 client announces $CMP_{2,1}$ (also termed $CMP_{1,2}$), $CMP_{2,3}$ and $CMP_{3,4}$. For the case where n=1, the tier 1 client announces a $CMP_{1,0}$, $CMP_{1,2}$, and $CMP_{2,3}$, where the $CMP_{1,0}$ is another name for an IMP. In one embodiment, the determination of the durations of the CMPs is percolated to the higher tier clients. For example, the tier 1 clients communicate CMP durations to the tier 2 clients, the tier 2 clients communicate CMP durations to the tier 3 clients and so on.

In another embodiment, the clients at each tier may determine the CMP durations from information from either higher or lower tier clients, independent of the other clients at the same tier. For example, in FIG. 4, the AP determines IMP 402 and $CMP_{1,2}$ 404, but one tier 1 client may determine the boundary between $CMP_{1,2}$ 414 and $CMP_{2,3}$ 416 and another tier 1 client may select a different boundary between its $CMP_{1,2}$ and $CMP_{2,3}$.

Notice that IMPs 402, 406 and CMPs 404, 414-428, do not overlap at the AP and tier 1 client, whereas there may be CMPs 408-412 at other levels that overlap with the IMPs 402, 406 since those CMPs do not affect the communications between the AP and the tier 1 clients. For example, when the AP and tier 1 clients are communicating, the tier 3 and tier 4 clients can simultaneously communicate without affecting each other. Thus, there is overlap with the IMPs 402, 406 and $CMP_{3,4}$ 408-412. During the $CMP_{1,2}$ 414, 418, other CMPs can take place that do not interfere with the communications of the tier 1 and tier 2 clients, e.g. $CMP_{4,5}$ 422, 426. During the $CMP_{2,3}$ 420, 424 other CMPs can take place that do not interfere with the communications of the tier 2 and tier 3 clients, e.g. $CMP_{5,6}$ 428.

Referring to the timing interpretation portion of FIG. 4, the behavior of a tier "n" client during $CMP_{n,n-1}$ and $CMP_{n,n+1}$ is to communicate with tier "n−1" and "n+1" clients, respectively. Further, during $CMP_{n+1,n+2}$, the tier "n" client does not communicate with clients in tiers, "n−1", "n" and "n+1", when they all communicate on the same channel. In another embodiment, if various tiers of clients can communicate on different channels, then the tier "n" client can communicate with clients in tiers, "n−1" and "n". In either case, during this period, the tier "n" client can perform other functions such as power save, passive scanning, active scanning on another channel etc.

Specifically, during the IMP 402, the AP communicates with the tier 1 clients 430. Similarly, during the IMP 406, the tier 1 clients communicate with the AP 434. In addition, the tier 2 clients do not communicate with tier 1 clients or with tier 3 clients 440. At the same time, the tier 3 and tier 4 clients can communicate 446, 452. When it is $CMP_{1,2}$ 404, the AP does not communicate with the tier 1 clients 432, but the tier 1 clients communicate with the tier 2 clients 436. Similarly, the tier 2 clients communicate with the tier 1 clients 442. At the time that the tier 1 and tier 2 clients are communicating 436, 442, the tier 3 clients can not communicate with the tier 2 and tier 4 clients 448, but the tier 4 clients can communicate with the tier 5 clients 454. For a portion of the $CMP_{1,2}$ 404, the tier 1 client does not communicate with the tier 2 clients 438 so that the tier 2 clients and the tier 3 clients can communicate 444,450. However, the tier 4 clients can not communicate with the tier 3 and tier 5 clients 456.

Figure 5:
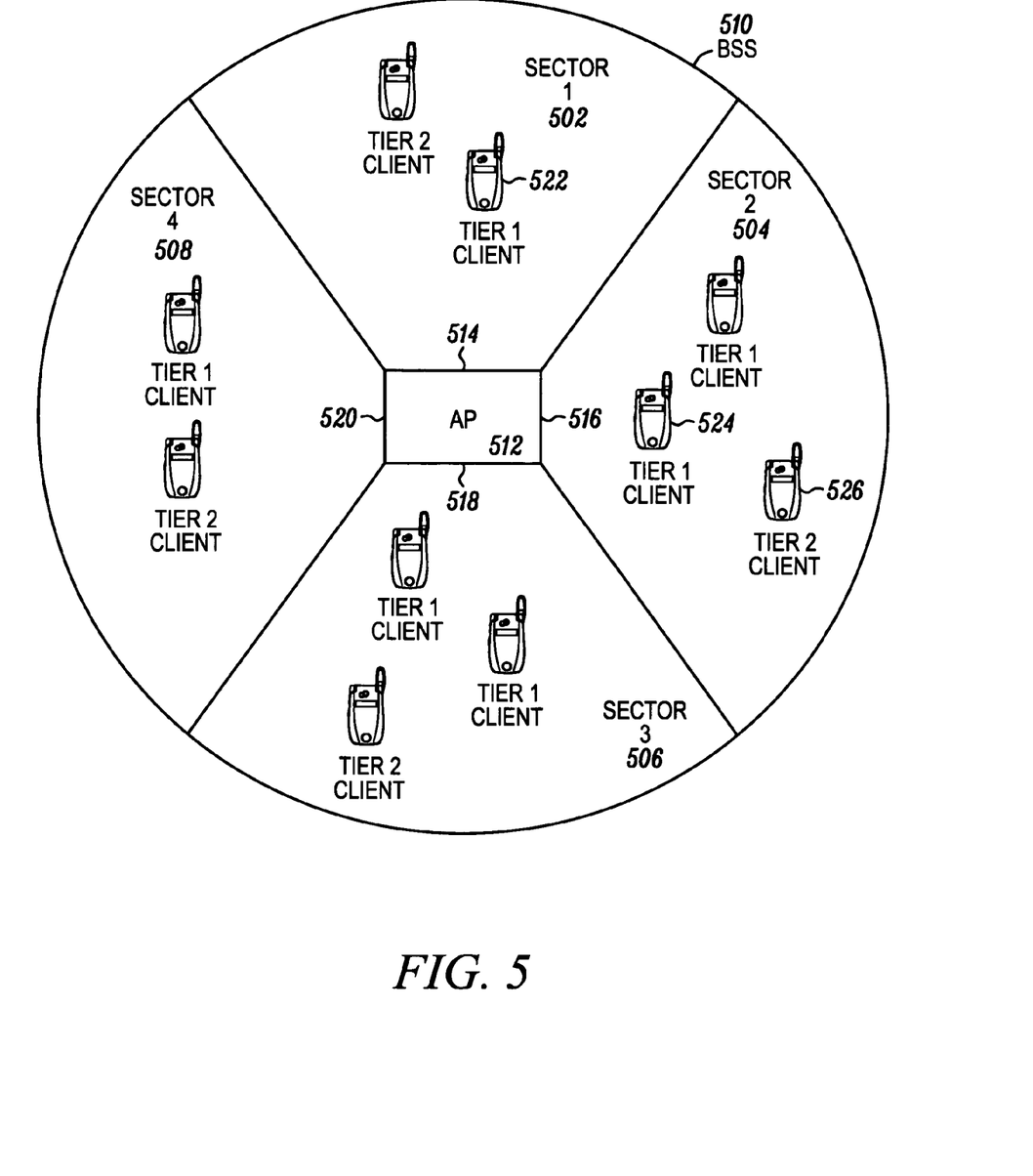
FIG. 5 is an example block diagram illustrating an alternative wireless local area network system in accordance with an embodiment of the invention.

Referring to FIG. 5, shown is a BSS 510 that is divided into four sectors 502, 504, 506, 508 where each sector has one or more tiers of clients. Even though FIG. 5 illustrates four sectors 502, 504, 506, and 508, the number of sectors associated with one access point may vary depending upon the design of the WLAN. Thus, the illustration of four sectors is not meant to be a limitation. Each sector is served by a directional antenna of the AP 512. For example, sector one 502 is served by directional antenna 514, sector two 504 is served by directional antenna 516, sector three 506 is served by directional antenna 518, and sector four 508 is served by directional antenna 520. By using directional antennae, the range of the BSS is increased. Further, using directional antennae allows the AP 512 to communicate with clients in one sector without clients in another sector hearing the communication. For example, when the AP 512 is providing coverage to sector one 502 and communicating with tier 1 client 522, tier 1 client 524 in sector two 504 is not able to hear the communication.

Because clients in one sector can not hear clients in another sector, IMP and CMP times may overlap so that the IMP time during which the AP is servicing one sector can be used by the clients of another sector for CMP time. For example, when the AP 512 is providing coverage to sector one 502 and communicating with tier 1 client 522, the clients in all the other sectors, namely 504, 506, 508, can be in CMP time since they are not able to hear the communication between the AP 512 and the tier 1 client 522.

Figure 6:
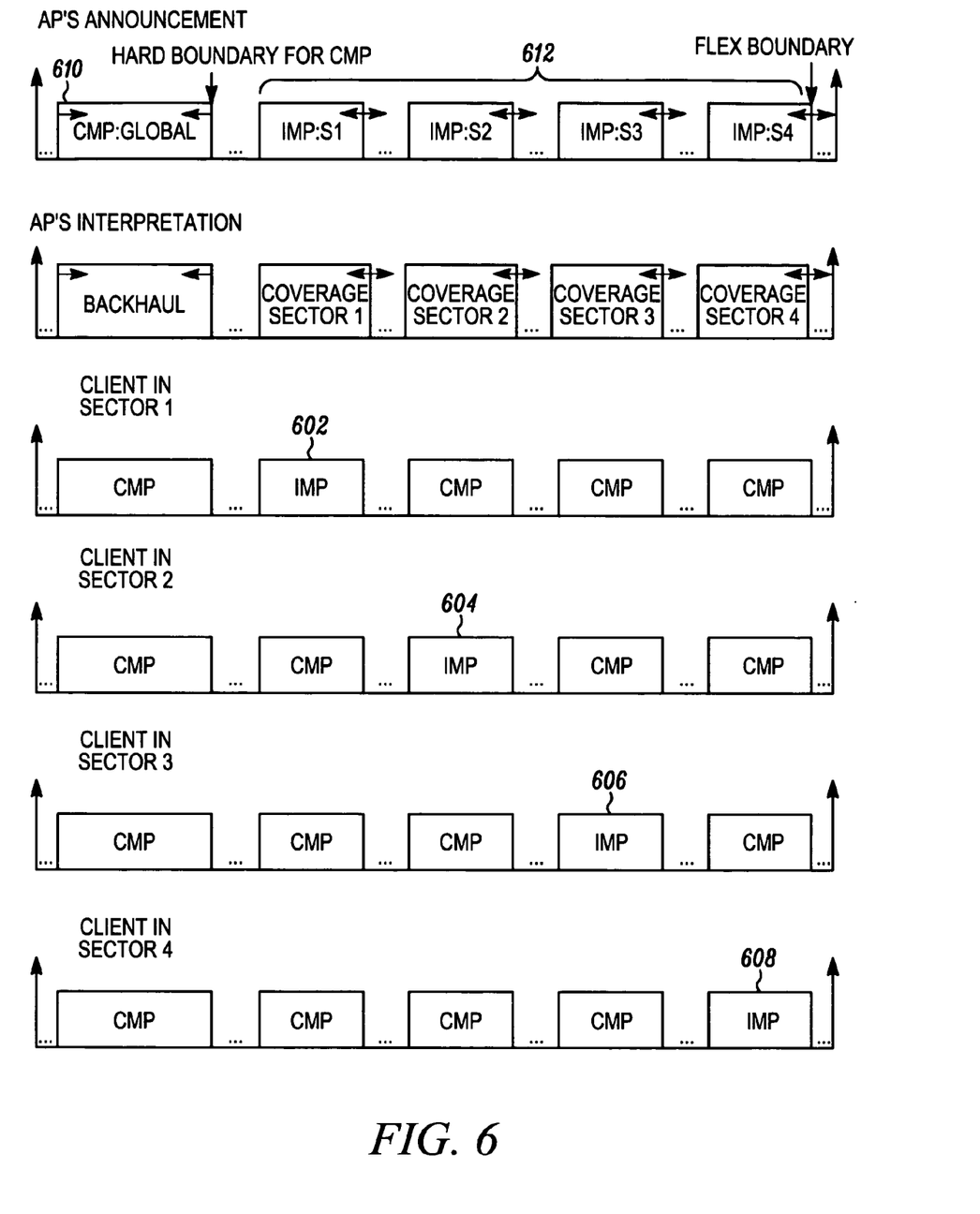
FIG. 6 is an example timing diagram illustrating IMPs and CMPs for the system of FIG. 5.

Illustrated in FIG. 6 is a timing diagram for when IMPs and CMPs occur for clients and the AP 512 in the BSS 510. As mentioned above, the AP 512 first determines the IMP and CMP times based upon a number of factors, e.g. factors related to the traffic and clients being served in the BSS 510. Thus, the AP 512 determines when the AP 512 will perform IMP and when it will perform CMP. In FIG. 6, the AP 512 has determined that it will perform CMP 610 and the set of IMPs 612. For ease of understanding, the CMP 610 is termed a global CMP since it is the time that the AP 512 allows CMP for all the clients in the BSS 510. In one embodiment, the global CMP 610 is of a short duration since each sector may have other opportunities for CMP.

During the global CMP 610, the AP 512 may perform functions unrelated to providing coverage (e.g. backhaul activities) and perform functions that do not interfere with the client communications of the BSS 510. During the set of IMPs 612, the AP 512 will alternate between each sector and provide coverage for the clients in each sector in a orderly fashion. For example, in FIG. 6, the AP 512 services the clients in sector 1, then sector 2, and so on. Thus, the AP 512 ensures that the IMPs for each sector do not overlap. For example, the IMP for clients in sector 1 is IMP 602 and IMP 602 does not overlap with IMP 604, IMP 606, and IMP 608.

Having determined the IMP/global CMP schedule, the AP 512 announces the IMP/global CMP schedule to the clients in the BSS 510. That is, the AP 512 announces the IMP/global CMP schedule to the tier 1 clients in the BSS 510. In one embodiment, the tier 1 clients, e.g. clients 522, 524, forward the schedule to the higher tier clients that they service. In another embodiment, the tier 1 clients only forward the IMP for their sector to the higher tier clients that they service. In any case, the announcement of the IMP/global CMP schedule and/or the IMP for the sector may be performed by a signaling message as mentioned above.

Knowing the IMP/global CMP schedule and/or the IMP for the sector, the clients in the BSS 510 can determine when to perform client to client communications. For example, tier 1 client 522 in sector 1 502 may perform IMP 602 which allows clients in the other sectors to perform client to client communications. That is, tier 1 client 524 can communicate with client 526 at the same time that the tier 1 client 522 is communicating with the AP 512. Thus, clients in sector 2 504, sector 3 506, and sector 4 508 can perform client to client communication while the AP 512 is communicating with tier 1 clients in sector 1 502. Similarly, when the AP 512 is communicating with tier 1 clients in sector 2 504, the clients in the other sectors can perform client to client communication.

In an embodiment of the present invention, performing client to client communication directly is advantageous because it reduces the amount of time that the client spends staying awake since the client has knowledge of the time that communications are sent to it. Thus, the client is able to save power by spending time sleeping when it is not in a CMP. In addition, having an IMP that does not overlap with a CMP minimizes interference. Further, performing client to client communication according to FIGS. 2 and 3 is advantageous because it extends the range of the AP. A client can indirectly utilize the AP even if the AP is not within hearing range.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

We claim:
1. A method for performing client to client communication in a wireless local area network comprising;
at an 'n' tier client in the wireless local area network, wherein the wireless local area network comprises multiple tiers of clients and where n is an integer:

receiving a signaling message from an 'n−1' tier client wherein the signaling message comprises information relating to a first period, a second period, and a third period wherein the first period is for communicating with the 'n−1' tier client, the second period is for not communicating with either the 'n−1' tier client or the 'n+1' tier client, and the third period is for communicating with an 'n+1' tier client;

communicating with the 'n−1' tier client during the communicated first period allowed for 'n−1' tier client and 'n' tier client communications; and communicating with the 'n+1' tier client during the communicated third period allowed for 'n' tier client and 'n+1' tier client communications.

2. The method of claim 1 further comprising the step of not communicating with the 'n−1' tier client during the second period.

3. The method of claim 1 wherein the step of communicating with the 'n+1' tier client further comprises:
determining a fourth period to start client to client communication wherein the fourth period occurs during a duration of the communicated third period;
capturing a channel during the fourth period;
communicating with the 'n+1' tier client during the fourth period by a) selecting the 'n+1' client from a list of clients and b) polling the 'n+1' tier client during the fourth period.

4. The method of claim 3 wherein information relating to the fourth period is communicated by sending a signaling message to the 'n+1' tier client.

5. The method of claim 3 wherein the 'n+1' tier client listens to the channel at a time taken from the group of a) from the start of the communicated third period, b) from the start of the fourth period, and c) at a random time during the duration of the third period.

6. The method of claim 1 further comprising forwarding the information relating to at least one of the first period, the second period, and the third period by sending a second signaling message to the 'n+1' tier client.

7. A method for performing client to client communication in a wireless local area network comprising; at an access point in the wireless local area network,
creating an association table identifying clients in the wireless local area network;
determining a first period for client to client communication based upon the association table and traffic in the wireless local area network;
communicating information relating to the first period by sending a signaling message to the clients; and
not communicating with the clients during the communicated first period wherein the communicated first period is set aside for client to client communications;
wherein the signaling message further comprises information relating to a second period wherein the second period is set aside for the access point to communicate with the clients.

8. The method of claim 7 wherein the signaling message is one taken from the group of a beacon transmission, a routing message, and a protocol related message.

9. The method of claim 7 wherein the signaling message further comprises information taken from the group of a start time, an end time, and a duration.

10. The method of claim 7 further comprising:
determining a period for a new client to associate with the access point;
communicating information relating to the period by sending a signaling message to the clients;
listening for an association request from the new client during the communicated period; and
responding to the association request from the new client during the communicated period.

11. The method of claim 7 wherein the access point comprises directional antennas for dividing the wireless local area network into sectors wherein each sector has clients and the access point determines a second period for clients in one sector wherein the second period is for access point to client communications in the one sector.

12. A method for performing client to client communication in a wireless local area network comprising, at a first client in the wireless local area network:
receiving a signaling message wherein the signaling message comprises information relating to a first period for client to client communication;
communicating with a second client during the communicated first period allowed for client to client communication; and
not communicating with an access point associated with the first client during the communicated first period;
wherein the signaling message further comprises information relating to a second period wherein the second period is set aside for the access point to communicate with the first client.

13. The method of claim 12 further comprising:
determining a period for a new client to associate with the first client;
communicating information relating to the period by sending a signaling message;
listening for an association request from the new client during the communicated period; and
responding to the association request from the new client during the communicated period.

14. The method of claim 12 further comprising forwarding information relating to at least one of the communicated first period and the second period to the second client by sending a second signaling message to the second client during a protected period of the wireless local area network.

15. The method of claim 12 wherein the second client does not communicate with the first client during the second period.

16. The method of claim 12 wherein the step of communicating with a second client further comprises:
determining a third period to start client to client communication wherein the third period occurs during a duration of the communicated first period;
capturing a channel during the third period;
communicating with the second client during the third period by a) selecting the second client from a list of clients and b) polling the second client during the third period.

17. The method of claim 16 wherein information relating to the third period is communicated by sending a signaling message to the second client.

18. The method of claim 16 wherein the second client listens to the channel at a time taken from the group of a) from the start of the communicated first period, b) from the start of the third period, and c) at a random time during the duration of the first period.

* * * * *